Jan. 21, 1969  J. BECKER  3,422,784
ONE-WAY DRIVE TRANSMISSION ARRANGEMENT, ESPECIALLY FOR
A STEERING ARRANGEMENT OF A VESSEL
Filed Feb. 14, 1967

INVENTOR.
Josef Becker

BY  Michael S. Striker
ATTORNEY

United States Patent Office 3,422,784
Patented Jan. 21, 1969

3,422,784
ONE-WAY DRIVE TRANSMISSION ARRANGEMENT, ESPECIALLY FOR A STEERING ARRANGEMENT OF A VESSEL
Josef Becker, 5401 Oberspay (Rhine), Germany
Filed Feb. 14, 1967, Ser. No. 616,096
Claims priority, application Germany, Feb. 15, 1966,
Sch 38,493/66
U.S. Cl. 114—146          11 Claims
Int. Cl. B63h 1/12, 25/42

ABSTRACT OF THE DISCLOSURE

A one-way drive transmission arrangement, especially for a steering arrangement of a vessel, and including stationary support means, a pair of turnable means, for instance a steering wheel and a shaft, carried by the support means turnable about a common axis and constructed and arranged for turning during turning of the steering wheel in either direction the shaft in the respective direction, and friction locking means between the stationary support means and the turnable means and constructed and arranged for preventing drive of the steering wheel by the shaft if a turning moment is applied to the latter by extraneous forces.

Background of the invention

The present invention relates to a one-way drive transmission arrangement which may for instance be used between a steering wheel and a rudder of a vessel or between a control lever and a member moved thereby and which is constructed in such a manner that during turning of the steering wheel in either direction the rudder is correspondingly turned while during application of a turning moment on the rudder by extraneous forces transmission of this turning moment to the steering wheel is prevented.

The purpose of such a one-way drive transmission arrangement, for instance in a steering arrangement of a vessel, is to simplify the work of the helmsman. In the absence of a one-way drive transmission, the helmsman is forced to hold the steering wheel continuously and he may be easily injured when the rudder hits during the movement of the vessel an obstacle and the steering wheel is suddenly turned about when the moment thus applied to the rudder is transmitted to the steering wheel. This is especially dangerous when the rudder is in the form of a rudder propeller.

One-way drives are known in the art, and it is also known to use such a one-way drive in a drive arrangement for rudder propellers. A known one-way drive includes for instance a worm gear transmission which may be self-locking in one direction, that is permitting only to drive the worm gear from the worm but not the latter by turning the worm gear. Such worm gear drives are however expensive and they have also due to the inherent friction a rather poor efficiency. In addition, such worm gear drives require continuous maintenance and the ratio of transmission is disadvantageous in steering arrangements for vessels.

It is an object of the present invention to provide a one-way drive transmission arrangement, especially for steering a vessel which avoids the disadvantages abovementioned of such one-way drive transmission arrangements known in the art.

Summary of the invention

A one-way drive transmission arrangement mainly comprising stationary support means, a pair of turnable means carried by the stationary support means and being constructed and arranged for turning, during turning of one of turnable means in either direction, the other of the turnable means in the respective direction, and frictional locking means between the stationary support means and the turnable means constructed and arranged for preventing drive of said one turnable means from the other of the turnable means.

In certain applications it is desirable to occasionally deactivate the locking means and the arrangement may also include means for rendering the locking means inoperative, whenever desired.

An advantageous construction is derived when the locking means includes a stationary cylindrical body and a curved spring substantially concentric with the cylindrical body and loosely engaging the peripheral surface of the latter and in which the ends of the springs are located between claws respectively fixed to the pair of turnable means in such a manner that during turning of said one turnable means a force is applied to the spring to disengages the latter from the peripheral surface of the cylindrical body, whereas when the other turnable means is driven by extraneous forces, the spring is pressed onto the peripheral surface of the stationary cylindrical body to prevent thereby driving of the one turnable means by the other turnable means. The spring may be applied to the outer peripheral surface of the cylindrical body, or the latter may be in the form of a hollow cylindrical body with the spring arranged in the interior thereof. In the latter case an especially simple and space-saving construction is obtained by constructing the spring as a helical spring having at least one winding with the opposite ends of the springs located between claws respectively connected to the pair of turnable means and in which the spring is wound in such a direction so that during turning of the one turnable means in either direction and stressing of the spring by the claw on said one turnable means the outer diameter of the spring is contracted and the latter is disengaged from the inner cylindrical surface of the cylindrical member and so that during stressing of the spring by the claw on the other of the turnable means the outer diameter of the spring is expanded and tightly pressed against the inner cylindrical surface. The spring in unstressed condition preferably frictionally engages the inner cylindrical surface with a frictional force sufficient to provide a counterforce to prevent during initial expansion of the spring turning of the latter about its axis.

An arrangement for selectively rendering the frictional locking means operative or inoperative may be derived by mounting the hollow cylindrical body in a split sleeve the inner diameter of which may be reduced or enlarged by clamping means connected to the split sleeve so that by tightening the clamping means the inner diameter of the hollow cylindrical body may be slightly reduced to increase the frictional engagement of the helical spring with the inner cylindrical surface of the hollow cylindrical body, while during loosening of the clamping means the diameter of the inner cylindrical surface of the hollow body will resiliently expand to reduce the frictional contact between spring and inner surface of the cylindrical body or to provide a small clearance between the spring and the inner surface. The split sleeve and the clamping means thereof may also be used to hold the cylindrical body in stationary position on the support means and the sleeve and the clamping means may be used for this purpose without changing substantially the frictional contact between spring and the inner surface of the cylindrical body. Another way to render the frictional locking means inoperative, whenever desired, is to mount the cylindrical body on the stationary support means turnable about its axis and to provide releasing means selectively movable between a locking position holding the cylindrical body in stationary position on the support means and a releasing position releasing the body for movement relative to the support means and rendering thereby the locking means inoperative. The last-mentioned arrangement is especially advantageous when the one turnable means comprises a steering wheel and when during movement of the releasing means from the locking to the releasing position the steering wheel is simultaneously uncoupled.

As mentioned above, the one-way drive transmission according to the present invention is especially suitable for the drive of a rudder of a vessel. A rudder drive provided with the one-way drive transmission according to the present invention is superior to one-way drives known in the art from the viewpoint of safety, price and maintenance. The one-way drive transmission according to the present invention is especially advantageous in drive arrangements for rudder propeller of vessels which are tiltable about a vertical axis in order to steer the vessel.

The one-way drive transmission according to the present invention will be especially reliable and foolproof in an arrangement in which two steering wheels are provided and in which whenever one of the locking means respectively associated with the two steering wheels is rendered inoperative, the respective steering wheel is at the same time uncoupled.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Description of the preferred embodiment

Figure 1:
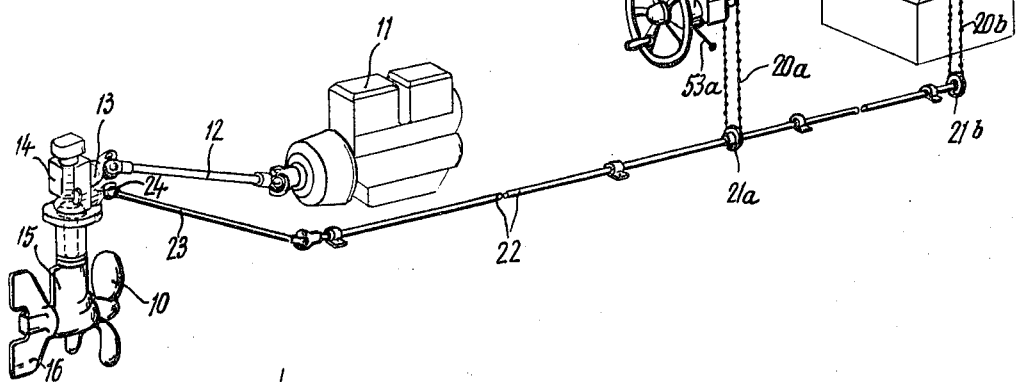
FIG. 1 is a schematic perspective view of a one-way drive transmission according to the present invention used for a steering arrangement of a vessel.

The one-way drive transmission according to the present invention may be used for the steering arrangement of a marine vessel as schematically illustrated in FIG. 1. The propeller 10 of the non-illustrated vessel is driven from a motor 11, for instance an internal combustion engine, through a cardan shaft 12, a preferably releasable coupling 13, and a bevel gear drive. The bevel gear drive is mounted in a drive housing 14 which carries a steering housing 15 turnable about a vertical axis and eventually also telescopically arranged with respect thereto. The steering housing 15 carries the propeller 10 turnable about a substantially horizontal axis. In order to steer the vessel, the steering housing 15 is turned together with the propeller 10 about the vertical axis. A stabilizing fin 16 extends rearwardly from the steering housing 15. In the arrangement schematically illustrated in FIG. 1, the steering arrangement, that is the steering housing 15 with the propeller 10 and the fin 16 attached thereto, can be selectively operated from two steering wheels 17a and 17b. The drive of the steering housing 15 from the steering wheels 17a and 17b is respectively transmitted over the one-way drive transmissions 18a and 18b according to the present invention, which will be described in further detail later on, a sprocket wheel 19a respectively 19b, the chains 20a and 20b and a second pair of sprocket wheels 21a and 21b mounted on the drive shaft 22 from which the steering moment is transmitted via a cardan shaft and a preferably releasable coupling 24 to the steering housing 15. The steering housing 15 and the propeller 10 and the fin 16 thereon are turned in the one or the other direction about the vertical axis to change the direction of movement of the non-illustrated vessel depending on the direction of turning of the steering wheels.

In order to prevent transmission of a moment applied by extraneous forces onto the steering housing 15, occurring for instance when the propeller 10 hits an obstacle, to the steering wheels so as to stabilize the steering arrangement and to protect the helmsman from sudden shocks, one-way drive transmissions according to the present invention are provided, the construction of which will now be described in connection with FIGS. 2 and 3. Since the one drive transmissions are identical for both steering wheels, the affixed letters $a$ or $b$ are omitted from the reference numerals of the elements shown in FIGS. 2 and 3.

Figure 2:
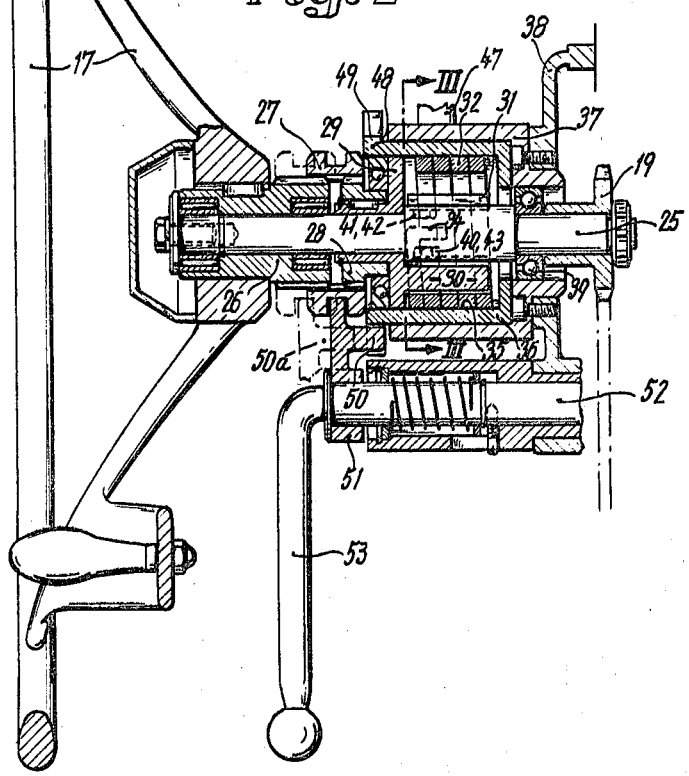
FIG. 2 is an axial cross-section through a one-way drive transmission according to the present invention.
Figure 3:
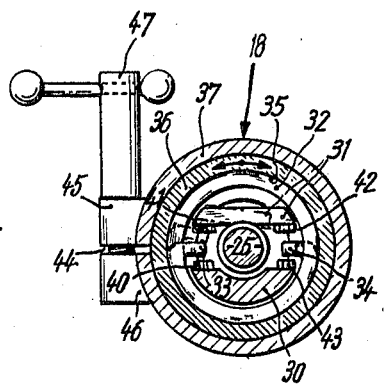
FIG. 3 is a transverse cross-section taken along the line III—III of FIG. 2.

As shown in FIG. 2, the sprocket wheel 19 is fixedly mounted on a shaft 25 in the region of one end of the latter and a steering wheel 17 is turnably mounted for instance by a pair of needle bearings in the region of the opposite end of the shaft 25. The hub of the steering wheel 17 is provided on the periphery thereof and on the side thereof directed toward the sprocket wheel 19 with a plurality of coupling teeth 26 on which a coupling sleeve 27 having corresponding coupling teeth is arranged movable in axial direction which engages in the position shown in full lines in FIG. 2 with the coupling teeth 28 of a hollow coupling shaft 29 located about the shaft 25 and turnable about the axis of the latter and forming the driving coupling half of the steering arrangement. The driving coupling half 29 is provided with a coupling claw 30, of a cross section as best shown in FIG. 3, which extends laterally of the shaft 25 toward the sprocket wheel 19. In the region of the coupling claw 30 and angularly spaced therefrom is a second coupling claw 31, fixed in any convenient manner to the shaft 25, by being for instance welded thereto. A helical spring 32 is wound with clearance about the two coupling jaws 30 and 31. The two ends 33 and 34 of the helical spring 32 are bent in such a manner so that they are arranged between the claws 30 and 31, as best shown in FIG. 3. A hollow cylindrical body 36 surrounds the coil spring 32 and the latter loosely engages in unstressed condition with the outer peripheral surface thereof the inner cylindrical surface 35 of the hollow body 36. The cylindrical body 36 is arranged coaxially with the shaft 25 and turnably mounted in a split sleeve 37, which in turn is fixedly connected by screws or the like to stationary support means 38, which may be, as shown in FIG. 2, in the form of a wall or the like forming part of the non-illustrated vessel. The shaft 25 may be turnably mounted in the wall 38 by means of ball bearings 39, one of which is shown in the drawing. Adjusting screws 40–43 are connected to the faces of the claws 30 and 31 which face each other in the region of the ends 33 and 34 of the coil spring 32 so that by means of the adjusting screws the play between claws and spring ends may be adjusted.

The sleeve 37 is provided with a longitudinal slot 44 and with a pair of projections 45 and 46 respectively arranged to opposite sides of the slot 44 and formed with aligned threaded bores therethrough in which a clamping screw 47 is threaded so that during tightening of the screw 47 the inner diameter of the sleeve 37 is reduced and the hollow cylindrical body 36 arranged therein is stationarily held. If the wall thickness of the hollow cylindrical body 36 is relatively small, the inner diameter of the hollow cylindrical body 36 may also be reduced during tightening of the clamping screw 47, or the cylindrical body 36 may also be slotted to assure that during tightening of the clamping screw its inner diameter will also be reduced to increase thereby the frictional contact between the outer surface of the coil spring 32 and the inner cylindrical surface of the cylindrical body 36. During loosening of the clamping screw 47 and corresponding increase of the inner diameter of the sleeve 36, the stationary clamping of the body 36 will be released and at the same time it is also possible to resiliently increase thereby the inner diameter thereof so that the coil spring 32 will lose its contact with the inner cylindrical surface of the cylindrical body 36.

The body 36 is provided on the side thereof facing the steering wheel 17 with a radially outwardly extending flange 48 formed with a plurality of openings 49 therethrough. A claw 50 connected to a member 51, which serves to move the coupling sleeve 27 in axial direction, may engage in a selected one of the openings 49. The member 51 is mounted non-movable in axial direction on a pin 52 which in turn is axially shiftable and turnably mounted in a bushing connected to the wall member 38. A handle 53 is fixedly connected to the pin 52, by being for instance integrally formed therewith, and the handle extends substantially normal to the axis of the pin. When the member 51 together with the claw 50 and the coupling sleeve 27 connected thereto are moved toward the right, as viewed in FIG. 2, the steering wheel 17 is connected with the claw 30 and the cylindrical body 36 is held in fixed position on the support means 38. On the other hand, when the member 51 is moved toward the left, as viewed in FIG. 2, the steering wheel 17 will be disconnected from the claw 30 by moving the coupling sleeve 27 toward the left, and at the same time the claw 50 will be moved to the position 50a as shown in dash-dotted lines in FIG. 2 to be removed from the opening 49 so that, assuming the cylindrical body 36 is not clamped in the sleeve 37, the cylindrical body 36 may freely turn about the axis. In order to hold the cylindrical body 36 is fixed position on the stationary support means 38 the clamping arrangement 44–47 may be used or the interlocking arrangement 49–53, or both arrangements together.

The above-described arrangement according to the present invention will operate as follows:

Assuming that the coupling sleeve 27 is moved toward the right, as viewed in FIG. 2 to the position as shown in full lines in FIG. 2, then the steering wheel 17 is connected to the claw 30 for rotation therewith and the cylindrical body 36 is held in stationary position. Simultaneously the clamping screw 47 may be tightened to additionally clamp the cylindrical body 36 and to assure frictional contact between the latter and the coil spring 32 in the unstressed condition of the latter. When the steering wheel 17 is now turned in one or the other direction, then the driving claw 30 connected thereto will act through one of the adjusting screws 40 or 43 on one of the spring ends 33, 34 and the spring will be stressed in a direction reducing the diameter thereof. The outer surface of the spring 32 is thereby disconnected from the inner cylindrical surface of the body 36 and the turning moment imparted to the steering wheel 17 is transmitted from the claw 30 to the claw 31 fixed to the shaft 25 so that the sprocket wheel 19 fixed thereto is turned and the turning moment transmitted through the members 20–24 to the steering housing 15 carrying the propeller 10 and the fin 16. On the other hand, if a turning moment is imparted by extraneous forces onto the steering housing 15, for instance when the propeller 10 hits an obstacle, the claw 31 will act through one of the adjusting screws fastened thereto onto the spring ends to stress the spring in a direction increasing the diameter thereof. The spring is thereby pressed with increasing pressure against the inner surface 35 of the cylindrical member 36 preventing thereby a drive from the shaft 25 to the steering wheel 17.

If two steering stands are used in the arrangement as illustrated in FIG. 1 the one-way drive of the stand not used is deactivated by loosening the clamping screw 47 and/or by retracting the claw 50.

In the above-described arrangement the steering wheel 17 and the elements 26–30 cooperating therewith form one of a pair of turntable means carried by the stationary support means 38, whereas the shaft 25 and the claw 31 fixed thereto form the other of the pair of turnable means constructed and arranged in such a manner that during turning of the one turnable means in either direction the other of the turnable means is turned in the respective direction, whereas the spring 32 and the cylindrical body 36 form friction locking means arranged between the stationary support means and the aforementioned turnable means and being constructed and arranged for preventing drive of the one turnable means, that is the steering wheel 17 and the elements cooperating therewith from the other turnable means, that is from the shaft 25.

The one-way drive transmission arrangement according to the present invention may not only be used in steering arrangements for ships or the like, but the one-way transmission drive may also be used in many other applications, for instance for controlling of a drive engine or coupling from a hand lever.

It will be understood that each of the elements described above, or two or more together, may also find a useful application in other types of one-way drive transmissions differing from the types described above.

While the invention has been illustrated and described as embodied in a one-way drive transmission especially suitable for steering a marine vessel, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent as set forth in the appended claims is:

1. In a one-way drive transmission arrangement, in combination, stationary support means; a pair of turnable means carried by said stationary support means arranged and constructed for turning, during turning of one of said turnable means in either direction, the other of said turnable means in the respective direction, each of said turnable means including a coupling claw, the coupling claws on said pair of turnable means being arranged to cooperate with each other for transmitting a turning moment between said turnable means; friction locking means between said stationary support means and said turnable means for preventing drive of said one turnable means from the other of said turnable means, said friction locking means comprising a cylindrical body having a cylindrical peripheral surface, a curved spring arranged substantially concentric with said cylindrical body and frictionally engaging in unstressed condition said cylindrical peripheral surface to provide a counterforce to prevent turning of the latter about its axis, and mounting means mounting said cylindrical body in stationary position on said stationary support means, said spring and claw being constructed in such a manner to impart, during turning of said one turnable means in either direction, a force to said spring to disengage the latter from said peripheral surface so that the other of said turnable means will be turned by said one turnable means in the respective direction, and to press, when said other turnable means is driven by extraneous forces in either direction, said spring onto said peripheral surface to prevent thereby driving of said one turnable means by said other turnable means; and adjustable means cooperating with said cylindrical body to adjust the diameter of said cylindrical surface so as to adjust the frictional force between said surface of said body and said spring when the latter is in said unstressed condition.

2. In a one-way drive transmission arrangement as defined in claim 1, wherein said cylindrical body is a hollow cylindrical body having an inner peripheral cylindrical surface, and wherein said spring is in form of a spiral spring having at least one winding and being arranged substantially concentric with said inner cylindrical surface and loosely engaging the latter, said spring being wound in such a direction so that during turning of said one turnable means in either direction and stressing of said spring by the claw on said one rotatable means, the outer diameter of said spring is contracted and the latter is disengaged from said inner cylindrical surface, and so that during stressing of said spring by the claw on the other of said rotatable means the outer diameter of said spring is expanded and tightly pressed against said inner cylindrical surface.

3. In a one-way drive transmission arrangement as defined in claim 2, wherein said adjustable means cooperates with said hollow cylindrical body to adjust the inner diameter thereof so as to adjust the frictional force between said inner surface of said body and said spring when the latter is in said unstressed condition.

4. In a one-way drive transmission arrangement as defined in claim 3, wherein said adjustable means includes a split sleeve surrounding said hollow cylindrical body in engagement with the outer surface thereof, and clamping means cooperating with said sleeve for changing the inner diameter thereof.

5. In a one-way drive transmission arrangement as defined in claim 1, and including rudder means of a vessel connected to said other turnable means to be steered thereby.

6. In a one-way transmission arrangement, in combination, stationary support means; a pair of turnable means carried by said stationary support means and being constructed and arranged for turning, during turning of one of said turnable means in either direction, the other turnable means in the respective direction, said other turnable means including a shaft provided with one claw, and said one turnable means including a steering wheel turnably mounted on said shaft, a sleeve member also turnably mounted on said shaft and provided with a claw adapted to cooperate with said claw on said shaft, and coupling means movable between an active position connecting said steering wheel to said sleeve member for rotation therewith and an inactive position; friction locking means including a cylindrical body, a curved spring substantially concentric with said body and loosely engaging a peripheral surface of the latter, and mounting means mounting said body on said support means, said spring having a pair of ends located between said claws and arranged so that during turning of said steering wheel in either direction a force is imparted to said spring to disengage the latter from said peripheral surface so as to turn said shaft by said steering wheel in the respective direction, and to press, when said shaft is driven by extraneous forces in either direction, said spring onto said peripheral surface to prevent thereby driving of said steering wheel by said shaft; and shiftable means movable between a locking position holding said body in stationary position on said support means and a releasing position releasing said body for turning movement relative to said support means and rendering thereby said locking means inoperative, said shiftable means being connected to said sleeve member for moving the latter from said active to said inactive position during movement of said shiftable means from said locking to said releasing position and vice versa.

7. In a one-way drive transmission arrangement, in combination, stationary support means; a pair of turnable means carried by said stationary support means and being constructed and arranged for turning, during turning of one of said turnable means in either direction, the other of said turnable means in the respective direction; a rudder propeller tiltable about a substantially vertical axis; connecting means connecting said other turnable means to said rudder propeller to tilt the latter about said vertical axis during turning of said other turnable means; and friction locking means between said stationary support means and said turnable means, said friction locking means being constructed and arranged for preventing drive of said one turnable means from the other of said turnable means.

8. In a one-way drive transmission arrangement as defined in claim 7, wherein said connecting means include a cardan shaft connected at one end to said rubber propeller, and transmission means connecting said other turnable means to the other end of said cardan shaft.

9. In a one-way transmission arrangement as defined in claim 7, and including an additional pair of turnable means carried by said stationary support means and being constructed and arranged for turning, during turning of one of said turnable means of said additional pair in either direction the other of said turnable means of said additional pair in the respective direction, said other turnable means of said additional pair of turnable means being connected to said connecting means, and friction locking means for said additional pair of turning means constructed and arranged for preventing drive of said one turnable means of said additional pair by said other turnable means of said additional pair of turnable means.

10. In a one-way drive transmission arrangement as defined in claim 9, wherein each of said friction locking means includes a body mounted on the stationary support means, and including releasing means for each friction locking means movable between a locking position holding the body of the respective friction locking means in stationary position on said support means and a releasing position releasing the respective body for movement relative to the support means and rendering thereby the respective locking means inoperative.

11. In a one-way drive transmission arrangement as defined in claim 10, wherein said one turnable means of each pair of turnable means comprises a steering wheel and a hollow coupling shaft, and including coupling means for each pair of turnable means movable between an engaged position coupling the respective steering wheel to the respective hollow coupling shaft and a disengaged position, and releasing means for each of said friction locking means movable between a locking position holding the respective body in stationary position on said support means and a releasing position releasing the respective body for movement relative to the support means and rendering thereby the respective locking means inoperative, each releasing means being connected to the respective coupling means for moving the latter to said disengaged position during movement of said releasing means to said releasing position and vice versa.

References Cited

UNITED STATES PATENTS

| 2,209,122 | 7/1940 | Houplain | 192—8 |
| 2,598,993 | 6/1952 | Gorske | 192—8 |
| 2,947,278 | 8/1960 | Magill et al. | 114—144 XR |

ANDREW H. FARRELL, *Primary Examiner.*

U.S. Cl. X.R.

192—8